UNITED STATES PATENT OFFICE.

BYRON F. McINTYRE, OF EAST ORANGE, NEW JERSEY, ASSIGNOR TO CHARLES M. COEN, OF WASHINGTON, DISTRICT OF COLUMBIA.

FIREPROOFING COMPOUND.

SPECIFICATION forming part of Letters Patent No. 391,327, dated October 16, 1888.

Application filed March 24, 1888. Serial No. 268,401. (No specimens.)

*To all whom it may concern:*

Be it known that I, BYRON F. McINTYRE, of East Orange, in the county of Essex and State of New Jersey, have invented a new and useful Improvement in Fireproofing and Preservative Compounds; and I do hereby declare that the following is a full, clear, and exact description of the same.

My invention is an improved composition of matter designed for fireproofing and preserving articles to which it is applied. Its main purpose is to protect combustible materials from fire, but is also useful to prevent decay, fermentation, and the ravages of insects. It is well understood that a fireproofing compound designed for the protection of fabrics, as well as wood and other combustible substances, should be capable of incorporation with and firm adhesion to the substance to which it is applied; that it should not be injurious to the texture of fine goods, nor interfere with their pliability or appearance, and that when treated with such fireproofing material such substances should be rendered non-inflammable and, under ordinary circumstances, incombustible; and my invention is designed to meet the requirements above stated.

Broadly stated, my invention consists of sulphoricinoleate of ammonia, or its prototypes, however produced, in combination with ammoniated and carbonated salts. In addition to these general ingredients there may be added, also, boracic acid, or other preservative salts.

The formula below given is a general working formula for fireproofing and preservation uses, although it may be required to be somewhat varied for special purposes.

For fireproofing purposes I take of sulphoricinoleate of ammonia, two parts; of carbonate of ammonia, two parts; soluble cream tartar, one part; acetate of soda, one part, and hydrochloride of ammonia, seven parts. When it is desired also to give the compound a preservative character, in addition to its fireproofing character, I add seven parts of boracic acid. To this mixture I add as many gallons of distilled water as there are pounds of the saline ingredients. The composition thus prepared has in a marked degree capacity to penetrate and permeate the cellular tissues of wood and woolen or spun fabrics of any kind, and it is perfectly innocuous, and does not rot, disintegrate, or in any way injure the substance or appearance of any object to which it is applied. When applied to wood or other similar porous articles, they should be freed from moisture before the application of the solution, and it does not leave upon the surface of them any visible sedimentary of crystalline salts, but covers and impregnates them with a flexible coating, which is invisible.

Colored goods with fast colors, and soft goods, as laces, tarletans, silks, and muslins, may be treated with a solution without injury to the colors or softness of the material, and are rendered fire-proof. The properties of the compound are not impaired by the addition of starch. It is applicable to pulp, and all material in the process of preparation for commercial uses. It may be added to paints, whether with mineral or metallic bases, water-colors, varnishes, or stains. The salts may be mixed directly and put into bottles for shipment, and may be dissolved in water according to directions by the user; and this is an important advantage, as thereby evaporation of the salts is avoided.

I claim as my invention—

1. A composition of matter for fireproofing purposes, consisting of sulphoricinoleate of ammonia mixed with ammoniated and carbonated salts, specified hereinbefore, as and for the purpose specified.

2. A composition of matter for fireproofing purposes, consisting of sulphoricinoleate of ammonia, carbonate of ammonia, soluble cream tartar, acetate of soda, and hydrochloride of ammonia, as and for the purpose specified.

In testimony whereof I have signed my name to this specification in the presence of two subscribing witnesses.

BYRON F. McINTYRE. [L. S.]

Witnesses:
JOHN CORELL,
R. NAFIE.